United States Patent [19]

Kirchner et al.

[11] Patent Number: 4,637,718

[45] Date of Patent: Jan. 20, 1987

[54] HAND-HELD OPTICAL FUEL PIN SCANNER

[75] Inventors: Tommy L. Kirchner; Hurshal G. Powers, both of Richland, Wash.

[73] Assignee: The United States of America as represented by the United States Department of Energy, Washington, D.C.

[21] Appl. No.: 214,806

[22] Filed: Dec. 9, 1980

[51] Int. Cl.⁴ .......................... G06K 9/24; G06K 9/32
[52] U.S. Cl. ...................................... 356/71; 250/236
[58] Field of Search .......... 356/71; 250/236, 566–568, 250/570; 350/6.4; 340/146.3 F; 235/467

[56] References Cited

U.S. PATENT DOCUMENTS

| | | | |
|---|---|---|---|
| 2,939,962 | 6/1960 | Miller | 250/236 |
| 3,205,367 | 9/1965 | Whitesell | 250/235 |
| 3,290,650 | 12/1966 | Bailey, Jr. et al. | 340/146.3 |
| 3,300,757 | 1/1967 | Beltz | 340/146.3 |
| 3,482,210 | 12/1969 | Lozier, Jr. et al. | 340/146.3 |
| 3,483,511 | 12/1969 | Rabinow | 340/146.3 |
| 3,676,847 | 7/1972 | Partin | 340/146.3 AC |
| 3,770,940 | 11/1973 | Harr | 235/467 |
| 3,812,459 | 5/1974 | MacNeill et al. | 340/146.3 F |
| 3,866,056 | 2/1975 | Minniear et al. | 250/566 |
| 3,868,636 | 2/1975 | Schlang | 340/146.3 J |
| 3,903,503 | 9/1975 | Dillingham et al. | 340/146.3 J |
| 3,934,225 | 1/1976 | De Possel | 340/146.3 J |
| 3,935,441 | 1/1976 | Aldrich et al. | 250/568 |
| 3,939,327 | 2/1976 | Humphrey | 250/567 |
| 4,056,804 | 11/1977 | Whitfield et al. | 340/146.3 J |
| 4,104,616 | 8/1978 | Isshiki et al. | 340/146.3 Y |

FOREIGN PATENT DOCUMENTS 2260833  9/1975  France .............................. 250/570

OTHER PUBLICATIONS

Jones et al., "Data Entering System", IBM Tech. Disc. Bull., 10–1971, pp. 1376–1378.

Primary Examiner—William H. Punter
Attorney, Agent, or Firm—Edward W. Nypaver; Robert Southworth, III; Judson R. Hightower

[57] ABSTRACT

An optical scanner for indicia arranged in a focal plane perpendicular to an optical system including a rotatable dove prism. The dove prism transmits a rotating image to a stationary photodiode array.

7 Claims, 4 Drawing Figures

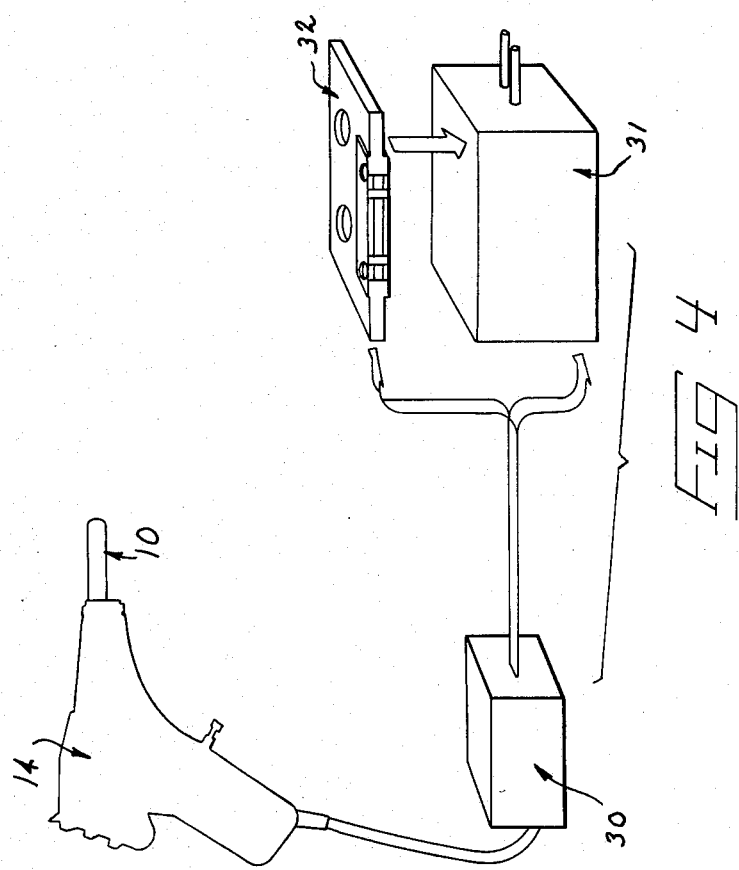

HAND-HELD OPTICAL FUEL PIN SCANNER

The United States Government has rights in this invention pursuant to Contract No. EY-76-C-14-2170 between the U.S. Department of Energy and Westinghouse Electric Corporation.

BACKGROUND OF THE INVENTION

This disclosure relates to a hand-held optical identification system developed for use in the fabrication of nuclear fuel bundle assemblies.

Where large volumes of fuel pins are required in a nuclear facility, automated methods of fuel pin accountability are needed during the fuel bundle assembly process. A six digit alpha-numeric identification is conventionally roll-stamped by the manufacturer about the circumference of each fuel pin top end cap. However, during the fuel bundle assembly process, this identification number usually becomes physically unreadable. A laser etching system has been previously developed to scribe the fuel pin identification number on the fuel pin end cap top surface. This disclosure describes a hand-held optical identification apparatus for reading the laser etched identification number.

The described optical apparatus is used in conjunction with optical character recognition circuitry not described in detail herein. This circuitry receives digitized information from the apparatus and processes such information to convert it to usable data. The general nature of the required circuitry is common to other optical character recognition applications.

SUMMARY OF THE INVENTION

An optical scanning apparatus for reading indicia imprinted about a circular planar area is disclosed. It includes a frame, a light detector on the frame for digitizing light patterns, indexing means for engaging the planar area and locating it at a focal plane, a light source, optical means including a rotatable dove prism interposed between the indexing means and light detector for directing reflected light from the focal plane to the light detector, and means for selectively rotating the dove prism to optically rotate the image from the focal plane.

It is a first object of this invention to provide an apparatus that can optically scan information imprinted at the planar end of a fuel pin without requiring rotation of the pin itself.

Another object of the invention is to provide such an apparatus that can be designed as a hand-held portable tool.

DESCRIPTION OF THE DRAWINGS

FIG. 4 is a schematic view of the system in which the reader head is used.

DESCRIPTION OF THE PREFERRED EMBODIMENT

Figure 1:
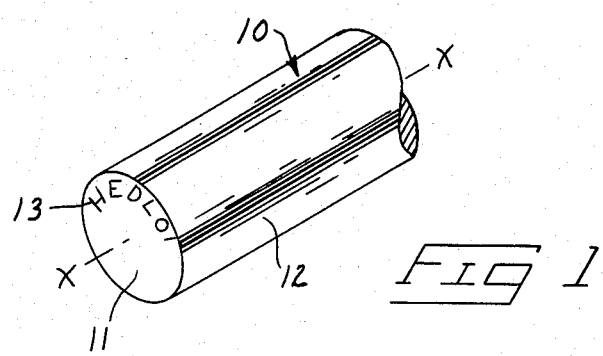
FIG. 1 is a top perspective view of a fuel pin.

This disclosure relates to a reader head for optically scanning indicia imprinted about a planar area, specifically the transverse outer end face of a nuclear fuel pin. The outer portion of a fuel pin 10 is schematically illustrated in FIG. 1. It includes a transverse circular end face 11 spanning an upper cylindrical wall 12 about the fuel pin. Imprinted indicia 13 are arranged about end 11 in a radial pattern centered about the fuel pin axis X—X. The indicia 13 might by any selected combination of letters, numerals or other symbols desired for identification or other purposes.

Figure 2:
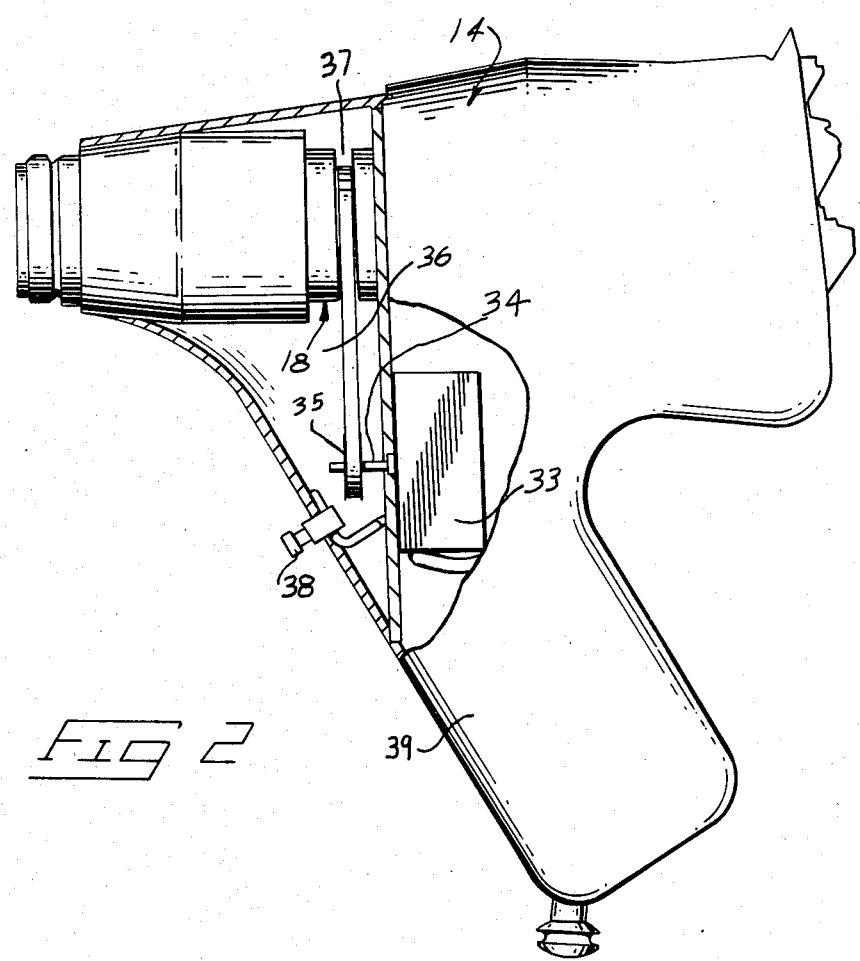
FIG. 2 is an exterior elevation view of the present reader head.
Figure 3:
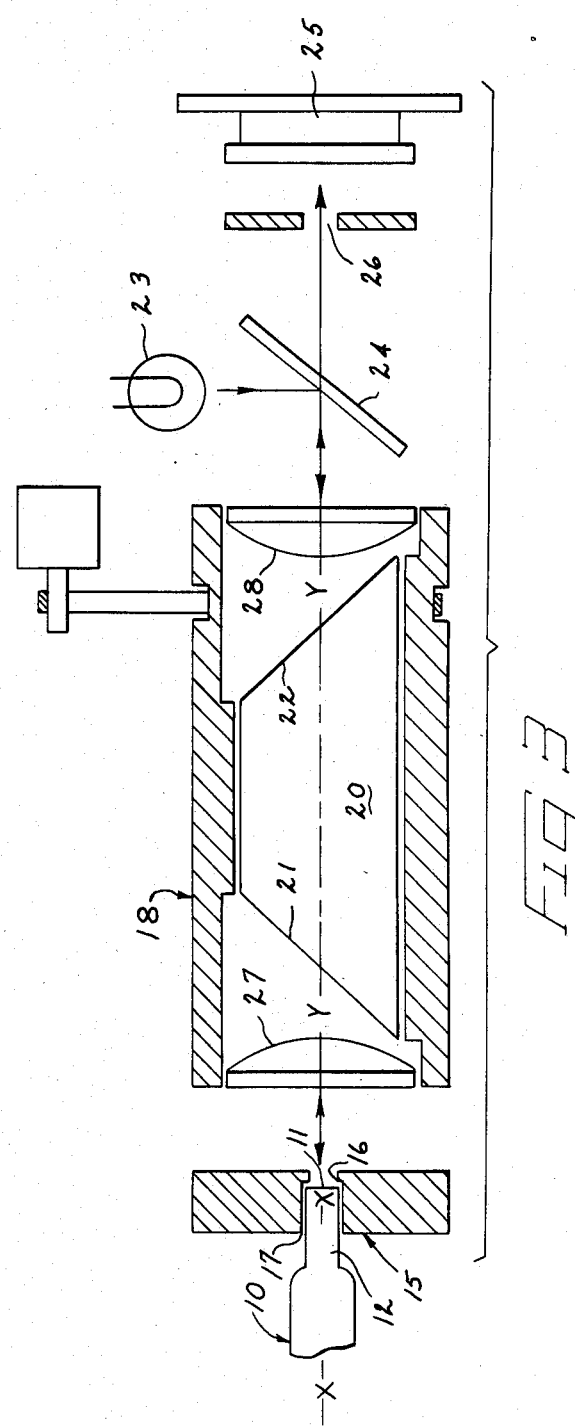
FIG. 3 is an enlarged schematic view of the reader head components.

The reader head is mounted within a frame or housing 14 (FIGS. 2 and 4) which is designed to be portable and hand-held. It is adapted to abut a single fuel pin 10 and automatically read the indicia 13 imprinted about its end 11. During this sequence, the fuel pin 10 is held stationary and the frame or housing 14 is held against it.

Indexing means is provided on the frame 14 in the form of a mechanical stop 15. Stop 15 is apertured to openly receive the top end of a fuel pin. The mechanical stop 15 includes an outwardly facing shoulder 16 surrounded by cylindrical guide walls 17 having an inner diameter suitable to accurately receive the top end of a fuel pin. The diameter of the aperture through mechanical stop 15 must be adequate to permit viewing of the total imprinted area about the fuel pin end 11. The mechanical stop 15 assures that end 11 is properly located in a stationary position within a preselected focal plane on the supporting frame 14. The complementary cylindrical guide walls 17 engage the cylindrical wall 12 of each fuel pin 10 to arrange the fuel pin in a coaxial relationship to the mechanical stop 15 and the aperture formed through it.

Light detector means is provided on frame 14 in the form of a conventional photodiode array 25, which receives incoming light through an aperture or slit 26. The photodiode array 25 digitizes rectangular slices imaged from the fuel pin end 11 at the preselected focal plane across the mechanical stop 15. The optical image received by the photodiode array 25 will be proportional to the surface reflectivity of the end 11 across fuel pin 10, permitting the reflected light to be converted into a series of digital signals for each scan.

Scanning of the area about the fuel pin end 11 is achieved through rotatable optical means arranged within a cylindrical barrel 18 rotatably mounted on the frame 14. The optical means includes a dove prism 20 having first and second oppositely directed ends 21 and 22. The prism 20 has a central prism axis Y—Y along the center of a clear aperture extending through ends 21 and 22. The prism 20 is located within barrel 18 with its central prism axis Y—Y coincident with the rotational axis of barrel 18. Rotation of the prism 20 about this axis will result in corresponding rotation of the image transmitted through it.

As such prisms are rotated, the image passing through rotates at twice the angular rate of the prism. Thus, even though fuel pin 10 remains stationary relative to the frame 14, the mechanical rotation of the prism 20 will rotate the image transmitted to the photodiode array 25.

As shown, barrel 18 also mounts first focusing means in the form of a plano-convex lens 27 optically aligned with the central prism axis Y—Y. Lens 27 directs the image reflected from the focal plane across mechanical stop 15 to the first prism end 21.

Second focusing means is mounted on the frame 14 in the form of another oppositely directed plano-convex lens 28 optically aligned with the central prism axis Y—Y. Lens 28 directs the transmitted image from the prism end 22 to the photodiode array 25.

A lamp 23 on the frame 14 provides light means directed onto the preselected focal plane across mechanical stop 15. The light means also comprises a perpendicular beam splitter 24 shown as a diagonal one-way mirror. The beam splitter 24 simultaneously reflects light from lamp 23 to the focal plane of the optical apparatus and transmits light reflected from the focal plane through the rotatable optical means to the photodiode array 25.

The aperture or slit 26 extends to one side from the imaged central prism axis in the rotating image as directed to the photodiode array 25. Thus, the area scanned by the array 25 corresponds to a radial rectangular pattern radiating outward from the fuel pin axis X—X.

As shown, the various optical components of the apparatus are arranged on the frame 14 in a coaxial relationship leading from the focal plane across mechanical stop 15 to the photodiode array 25. Electronic slices of information from the photodiode array 25 will correspond to radial rectangular slices of optical information imaged across the end 11 of a stationary fuel pin 10 properly positioned within the mechanical stop 15. By rotating barrel 18 one complete revolution, a total scan of the end surface area can be obtained. In practice, it is desirable to make two revolutions in order to permit electronic indexing from a gap between the first and last digits of a number or to identify other indexing indicia necessary for verification purposes.

This arrangement makes use of the ability of a dove prism to rotate a stationary image without visual distortion. It is relatively simple in mechanical structure and can be readily incorporated within a hand-held frame 14.

As shown in FIG. 4, the hand-held reader head is used in combination with pre-optical character recognition electronics circuitry shown at 30, which typically would contain the system memory, automatic gain control circuits and a microprocessor to control the systems management functions of the apparatus. These circuits condition the video data from the reader head for direct input into the optical character recognition logic circuitry shown at 31. Circuitry 31 is a conventional logic unit which analyzes the fuel pin image and outputs the identification number in the desired format. A tape storage system, schematically shown at 32, can be included for field use of the optical reader head. Identification numbers stored in the system 32 can be used for later playback into the circuits 30 and 31 as desired.

The means for rotating barrel 18 and thereby prism 20 includes a motor 33 connected to a suitable power source (not shown) and provided with an output shaft 34 having a drive pulley 35 rigidly secured thereto. A suitable drive belt 36 is entrained about pulley 35 and an annular recessed portion 37 formed on the barrel 18. A trigger type plunger or actuator 38 is mounted on the grip 39 of frame 14 for selectively energizing motor 33 to effect rotation of barrel 18 via the pulley-belt drive arrangement.

Having described my invention, I claim:

1. A portable, hand-held apparatus for optically scanning indicia imprinted about a planar end face of an article having an outer wall surface, said apparatus comprising:
   a supporting frame;
   light detector means fixed to said frame for digitizing light patterns directed thereto;
   indexing means on said frame for engaging said planar end face and locating said end face in a preselected focal plane on the frame, said indexing means having an inner wall surface complementary to said article wall surface for disposition thereabout and terminating in an end portion beyond said planar end face, said inner wall surface having a radially inwardly extending shoulder spaced from said end portion and engagable with said planar end face;
   light means directed onto said preselected focal plane;
   optical means mounted on said frame about a central axis, said optical means being optically interposed between said indexing means and said light detector means for directing reflected light from said preselected focal plane to said light detector means and including a dove prism centrally aligned along said central axis;
   and means for selectively rotating the dove prism relative to the frame about the central axis to thereby rotate the image from the focal plane as transmitted to said light detector means.

2. A portable, hand-held apparatus for optically scanning indicia imprinted about a planar end face of an article having an outer wall surface, said apparatus comprising:
   a support frame;
   light detector means fixed to said frame for digitizing light patterns directed thereto;
   indexing means on said frame for engaging said planar end face and locating said end face in a preselected focal plane on the frame, said indexing means having an inner wall surface complementary to said article wall surface for disposition thereabout and terminating in an end portion beyond said planar end face, said inner wall surface having a radially inwardly extending shoulder spaced from said end portion and engagable with said planar end face;
   light means directed onto said preselected focal plane;
   a dove prism having a central prism axis along the center of a clear aperture extending through oppositely directed ends, said dove prism being mounted on said frame for relative rotational movement about its central prism axis;
   first focusing means on said frame optically aligned with the central prism axis for directing light reflected from the preselected focal plane into one end of the dove prism;
   second focusing means on said frame optically aligned with the central prism axis for directing light from the remaining end of the dove prism to said light detector means; and
   drive means on said frame operably connected to said dove prism for selectively rotating it about the central prism axis.

3. An apparatus as claimed in claim 2 wherein said light detector means includes an aperture having the form of an elongated rectangular slit that extends to one side from the image along the central prism axis directed to the light detector means by said second focusing means.

4. An apparatus as claimed in claim 2 further comprising:
   beam splitter means on said frame intersecting the imaged central prism axis between said second focusing means, said light means, and said light detector means for simultaneously reflecting light from said light means to said preselected focal plane and transmitting light reflected from said preselected focal plane through said dove prism to said light detector means.

5. A portable hand-held apparatus for optically scanning indicia imprinted about the transverse circular end of a nuclear fuel pin in a radial pattern centered about the fuel pin axis; said apparatus comprising:

a supporting frame;

light detector means fixed to said frame for digitizing light patterns directed thereto;

an apertured mechanical stop on said frame having an inner wall surface complementary to the cylindrical surface of said fuel pin for disposition thereabout and terminating in an end portion beyond said circular end, said inner wall surface having a radially inwardly extending shoulder spaced from said end portion and adapted to be abutted by the imprinted circular end of said fuel pin to locate said end within an open preselected plane on the frame in a stationary position;

light means directed onto said preselected plane;

rotatable optical means mounted on said frame about a central axis, said optical means being interposed between said mechanical stop and said light detector for directing reflected light from said preselected focal plane to said light detector means through a dove prism centrally aligned along said center axis; and drive means for selectively rotating the dove prism relative to the frame about said center axis.

6. An apparatus as set out in claim 5 wherein the fuel pin axis of a fuel pin abutting the mechanical stop shoulder is coaxial with said center axis of the rotatable optical means.

7. An apparatus as set out in claim 5 wherein the fuel pin axis of a fuel pin abutting the mechanical stop shoulder is coaxial with said center axis of the rotatable optical means;

said light detector means including an aperture in the form of an elongated rectangular slit extending to one side from the image of the fuel pin axis directed to said light detector means by said rotatable optical means.

* * * * *